United States Patent [19]
Huber

[11] 3,945,390
[45] Mar. 23, 1976

[54] SEALING SYSTEM FOR SHUTOFF ELEMENTS

[75] Inventor: Richard Huber, Modling near Vienna, Austria

[73] Assignee: Klinger AG, Zug, Switzerland

[22] Filed: Apr. 5, 1974

[21] Appl. No.: 458,427

[30] Foreign Application Priority Data
Apr. 9, 1973  Austria ............................. 3119/73

[52] U.S. Cl. ................. 137/1; 251/333; 251/334; 251/210
[51] Int. Cl.² ........................................ F16K 25/00
[58] Field of Search ........... 251/334, 332, 333, 210; 137/329.05

[56] References Cited
UNITED STATES PATENTS

| | | | |
|---|---|---|---|
| 676,580 | 6/1901 | French | 251/334 |
| 908,138 | 12/1908 | Ricksecker, Jr. | 251/333 X |
| 1,202,044 | 10/1916 | Fisher | 251/333 X |
| 1,234,096 | 7/1917 | Farrell | 251/333 X |
| 3,108,779 | 10/1963 | Anderson | 251/368 X |
| 3,384,107 | 5/1968 | Kuskevics | 251/334 X |

FOREIGN PATENTS OR APPLICATIONS

| | | | |
|---|---|---|---|
| 390,695 | 4/1933 | United Kingdom | 251/210 |
| 666,167 | 10/1938 | Germany | 251/210 |

*Primary Examiner*—Arnold Rosenthal
*Attorney, Agent, or Firm*—Karl W. Flocks

[57] ABSTRACT

A sealing system for a shutoff element having two substantially ring-shaped sealing elements forming at least two substantially ring-shaped sealing lines. A given one of the sealing elements is constructed as a thin-wall body which is elastically deformable under the action of a closing force. The given sealing element, in the closed position of the shutoff element, under deformation of its wall bearing against the other sealing element at least at two ring regions with line contact. Means define free deformation spaces for the wall of the thin-wall body beneath said ring regions, and means define a respective support adjacent said deformation spaces and extending substantially parallel to the ring regions and against which bears said wall.

19 Claims, 4 Drawing Figures

SEALING SYSTEM FOR SHUTOFF ELEMENTS

BACKGROUND OF THE INVENTION

The present invention relates to a new and improved construction of sealing system for shutoff elements, which sealing system is of the type embodying two substantially ring-shaped sealing elements, wherein one such sealing element is sealingly connected with the housing or with a closure or blocking element of the shut-off element and the other sealing element is either sealingly connected with the closure element or the housing or is constructed at such itself, and wherein the sealing elements can be pressed against one another by a closing movement of the closure element for carrying out the shutoff action of the shutoff element.

The heretofore known sealing systems for shutoff elements can be essentially divided into two groups, namely, the so-called "hard" seats and those which possess the so-called "soft" seats.

Sealing systems with "hard" seats, i.e. equipped with metal hard-sealing elements, are extensively wear-and-temperature resistant, yet are practically not capable of providing a liquid and gas seal for liquids and gases of low viscosity, additionally they are quite sensitive to contamination or soiling. This is so because both of the sealing elements in the closed or sealing position — for instance in the case of valves arranged in a radial plane — have the ring-surfaces bearing against one another and thus contaminants can easily deposit thereat and during the closing movement can become pressed into both seat surfaces. These hard seats additionally are generally welded at the housing seat or closure or blocking element and subsequently machined by grinding.

An appreciably greater gastight seal is provided by sealing systems with "soft" seats, i.e. sealing elements formed of plastic or the like, especially those equipped with a hard and a soft element, because then there can be realized a good mutual fit of both sealing surfaces and contaminants can be pressed into the soft elements and in many instances does not lead to damage. Such "soft" seats, on the other hand, have the drawback that for the soft element there can be only completely or partially used materials formed of organic substances, and which only can be exposed to prescribed operating conditions, especially operating temperatures, which in many instances are much too low.

Attempts have already also been made to improve upon the sealing action of the shutoff element in that there have been constructed sealing systems with multiple seats, so that two or more ring-shaped sealing regions —arranged behind one another— serve to guarantee the seal. Particlarly in the case of hard seats, where there are present defects in the sealing capability, such multiple seats likewise cannot be constructed to provide a good sealing action because all of the seats must sealingly bear against one another in the same position, and this condition cannot be attained with elements which are practically non-deformable.

There are also known to the art valve constructions equipped with comb-like mutually interengaging thin ring portions formed of metal which are intended to provide a multiple seal in that the thin ring portions of the one element bear with their respective tips, with mutual deformation, at the flanks of an associated ring portion of the other element. Such shutoff elements have been known in this particular field of technology for quite some time, but as a practical matter have not yet been placed into commercial use, presumably because such sealing elements are surely extremely difficult and expensive to manufacture and therefore practically can only come under consideration for special applications.

SUMMARY OF THE INVENTION

Hence, it is a primary object of the present invention to provide an improved sealing system for shutoff elements which is not associated with the aforementioned drawbacks and limitations of the prior art proposals.

Another and more specific object of the present invention aims at an improved construction of sealing system which is relatively simple in construction and design and equipped with a number of seats, the sealing system combining the advantages of sealing systems with hard seats and those having soft seats, without at the same time exhibiting the drawbacks thereof.

Another object of the invention aims at the provision of a new and improved sealing system which, on the one hand, does not possess the temperature limitations of organic sealing substances and, on the other hand, possesses good sealing action for non-viscous media and gases.

The invention is predicated upon the concept that one of the sealing elements should be "soft", however fabricated from metal, and this can be realized by using a thin-wall body which can be elastically deformed under the action of the closing force.

A sealing system constructed according to the invention and of the previously mentioned type is essentially manifested by the features that the one sealing element is constructed as a thin-wall body which can be elastically deformed under the action of the closing force, this thin-wall body extending over the ring width of the relevant sealing element and in the closed position, under deformation of its wall, bearing with line contact at the other sealing element in at least two ring regions, and wherein the closure or blocking element or housing which is connected with the thin-wall body possesses beneath such ring regions freely deformable spaces for its wall and adjacent such spaces a respective support extending parallel to the ring regions and against which bears such wall.

Both of the elements only thus contact along lines. Therefore at least one of the elements is curved towards the outside in the direction of the other element at such contact lines, so that at these locations, during the construction of an element as a thin-wall body, there are produced elastic deformations under the action of the closing force. Such elastic deformations also positively provide, in the case of a number of seats, sealing line contact at all locations, wherein the characteristic of the elastic deformation brought about under the action of the closing force, can be determined by the selection of the spacing of the line contact with respect to the supports. Due to the sealing action in the form of line contact there is extensively prevented the possibility of contaminations or the like depositing at the contact lines, because the curved element surfaces which are always present can more easily penetrate the contaminants at the contact lines or displace such to both sides than would be the case when there are provided two surfaces which contact one another in parallelism.

If ring spaces or compartments are provided between the ring regions with line contact at the region between the wall of the one element and the other sealing element, then in a position of the closure or blocking element which is close to the closing position there occurs a throttling of the still throughflowing medium at those locations where later on there occurs the tangential line contact, yet between such locations in the case of compressible media there however occurs an expansion, so that there is realized a stepwise or stage throttling of the medium flow prior to closure and thus a major portion of the ring region is only slightly exposed to erosion effects.

Further, for attaining the desired throttling action and the therewith associated side effects —such as the formation of noise— different ring or annular spaces can possess different volume and/or cross-section. The effect of the throttling action can be further intensified in that the ring regions with line contact and/or the ring spaces form flow by-passes. Protection of the multiplicity of ring regions with line contact also can be realized in that in one position of the closure element immediately prior to the closed position the sealing elements only bear against one another at one region with line contact and the other provided ring regions with line contact first result in steps or stages during further closing movement by elastic deformation of the thin-wall body. In this way there can be realized an extensive shutoff action already with only one ring region with line contact, so that the contact at the other provided regions occurs practically without any flow load. At least one of both elements can be provided with a coating or covering which favorably influences the sliding and/or sealing behavior in that there can be thus prevented or compensated possible surface irregularities.

Additionally, in the case of a sealing system for valves, there can occur a sliding action between both of the sealing elements with deformation of the thin-wall body if the outer surface of a sealing element is inclined at the ring regions with line contact at an acute angle in the direction of the closing axis of the valve. This affords the advantage that at the regions with line contact at both elements during each closing and opening operation there occurs a mutual smoothing effect or operation, so that during the throughflow any slight surface damage to the elements which has arisen can be again compensated; apart from the foregoing there is realized an additional scraping cleaning action.

A very simple sealing system for valves can be realized if the deformable thin-wall body is constituted by a plate formed of sheet metal or a cone in the form of concentrically juxta-positioned undulated peaks and valleys, the outer- or inner- edge of which is connected with the closure element or the housng and supported at the regions of the valleys and/or peaks. If the support of the thin-wall metal body is provided at the housing or the closure element, with which it is connected, at the region of the valleys, then the counter or opposite surface of the other element can either be flat or conical respectively, so that the ring regions with line contact bear at the crests or peaks and there are formed intermediate thereof in a very simple manner ring spaces. However, it is also possible to provide the ring regions with line contact at the flanks of the undulations which are inclined in the direction of the closing axis of the valve, in which case there is provided the previously mentioned smoothing- and cleaning action during each relative movement of both elements. In this regard then the other element must have comb-like ring projections which engage into the wave valleys.

Furthermore, it is also possible in the case of valves and a thin-wall body of conical configuration and formed of metal, to only provide supports between the valleys and in the valleys to provide regions with line contact, if the sheet metal cone connected at the outer- or inner edge with the closure element or the housing, has the surfaces which are directed towards the closure element or housing respectively, supported by ring edges provided at regular intervals or spacing, wherein between the ring edges there are provided ring-shaped depressions which deviate from the conical shape and which contain the ring regions with line contact. With this constructional embodiment there is likewise attained at the ring regions with line contact a smoothing- and cleaning effect, especially at the thin-wall body, which is this case must be constructed as a stepped cone and provides additional throttling action when positioned near the closing position.

It is also possible that with a sealing system for valves, the thin-wall body is deformed in part, not prior to, rather first after its assembly. In this regard the thin-wall body of the sealing system which is assembled at the shutoff valve is first thus brought into the desired final shape or form in that the closure element or an embossing, the dimensions of which need not correspond to those of the closure element, is pressed in the direction of the closing axis towards the housing with a force which considerably exceeds the prescribed closing force. In this way there is reached the result that both of the sealing elements at the ring regions with line contact are accommodated or fitted to one another without any play and the elastic deformation of the thin-wall body is exclusively available for producing the surface compression required for sealing. Additionally, it is thus possible that following a certain wear of the sealing element owing to its longer operational use, it can be brought into a somewhat changed or modified final shape due to renewed plastic deformation of the thin-wall body, and in which there is again provided a contact of both elements against one another without play at the regions of tangential line contact.

It is also possible to use the sealing system of this development for a multiple-seat sealing of a flap or throttle valve; preferably then the deformable thin-wall body is constituted by a sheet-metal cone in the form of concentric wave peaks and valleys located adjacent one another, the outer- or inner edge of which is connected with the flap valve body or the housing and is supported at the region of the wave valleys at the flap valve body or housing, respectively, the valve peaks containing the ring regions with line contact. A prerequisite for this arrangement is that the axis of rotation of the flap member does not extend through the sealing element rather adjacent thereto, and it is preferable that the axis of rotation flap member does not intersect the axis of the housing seat, rather crosses such, so that during the opening movement there also occurs a lifting of both sealing elements and not only a mutual displacement.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
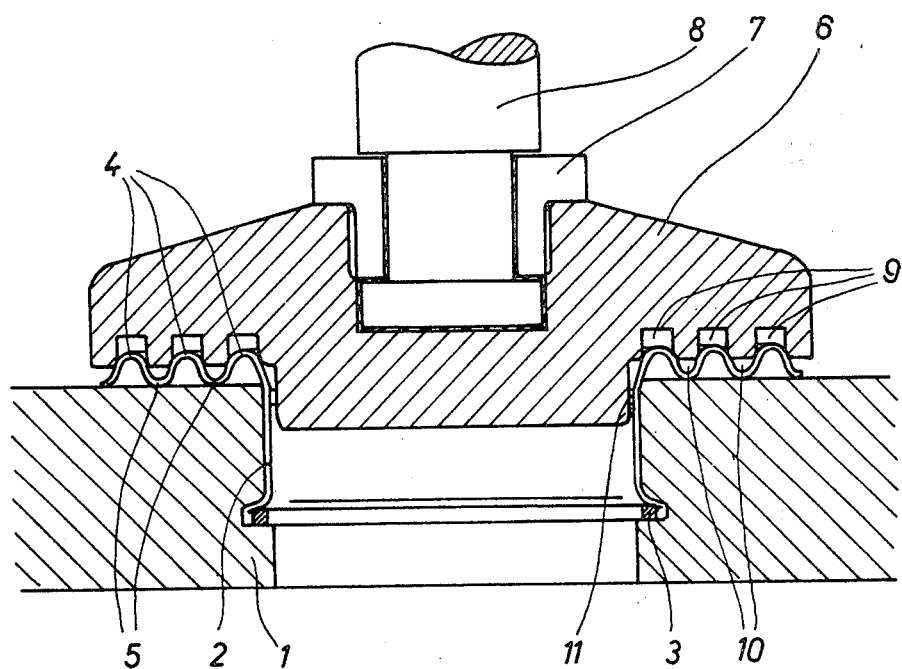
FIG. 1 is an elevational sectional view of a closure or blocking element and housing of a shutoff valve equipped with the sealing system of this development.

Describing now the drawings, in the exemplary embodiment depicted in FIG. 1, it is to be understood that a sheet metal body member or shell 2, which forms a thin-wall body is sealingly secured through the agency of a contact or press-in ring 3 in a housing 1 of a shutoff valve. The sheet metal body 2 consists of a sleeve-shaped portion 2a and a plate-shaped portion 2b, the plate-shaped portion possessing an undulated portion forming, for instance three concentrically arranged crests or peaks 4 and intermediate such peaks two concentric valleys 5. In the illustrated partial sectional view of shutoff valve there also is shown the valve plate 6 serving as the closure or blocking element and which forms the other element. Valve plate 6 is rotatably, yet axially non-displaceably connected with a valve spindle 8 through the agency of a bipartite threaded connection member 7. This valve plate 6 is equipped with grooves or recesses 9 at the region of the crests or peaks 4 of the thin-wall sheet metal body 2, these grooves 9 contacting the flanks 2c of the concentric locations, the valleys 5 bearing against the valve housing 1, as shown. The sheet metal member must be dimensioned such that due to the action of the closing force at the flanks and which is applied by the spindle and handwheel or by a motor drive, it is elastically deformed to such an extent that these flanks, with sufficient compression, are sealingly in contact with the edges of the grooves 9 of the valve plate 6 at six ring regions 2d. During opening or closing of the valve, there are formed by such six ring regions 2d possessing line contact narrow throughpassages where the medium reaches greater throughflow velocities, and wherein however between such narrow throughpassages, in the case of compressible media, there occurs at each ring space or compartment 10 an expansion of the medium together with a deflection thereof, so that the next throughpassage is only impinged with a slight pressure gradient. Additionally, a projection or depending portion 11 is provided at the valve plate 6 and which first then frees the entire throughflow cross-section in the housing 1 when both sealing elements are already spaced somewhat from one another. In this regard it is immaterial whether the pressure impingement occurs from the bottom or from the top at the valve plate 6, as long as the pressure differential is not so large that the pressure during impingement of the top of the valve plate during the opening movement presses the sheet metal part against the valve plate which moves away and thus brings about a plastic deformation of such part.

Figure 2:
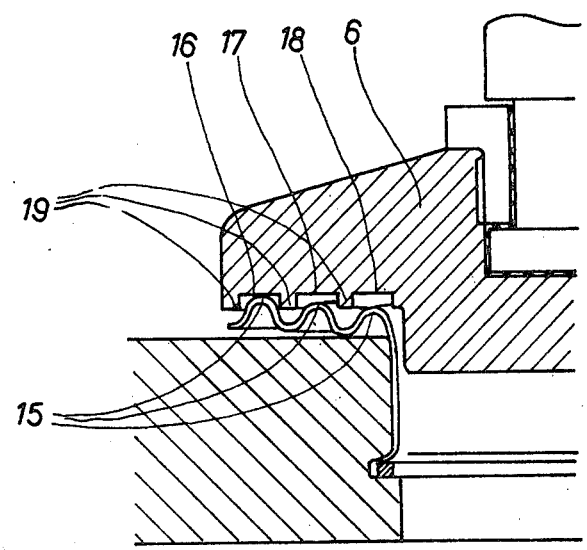
FIG. 2 illustrates a modified construction from that shown in FIG. 1.

With the construction of sealing system depicted in FIG. 2, which is constructed in the same manner as the arrangement of FIG. 1 as concerns the housing and closure or blocking element, the ring regions with line contact are provided at the top or apex of the crests or peaks. In this instance, the plate-shaped portion 2b of the thin-wall sheet metal part 2 is constructed so as to slightly ascend or slope towards the outside, so that during the course of the closing movement initially only the outermost crest or peak comes into contact with a radial ring surface 16 of the valve plate 6, as illustrated. During the course of the further closing movement the additional inner situated tops or apexes of the peaks or crests 15 stepwise come into contact with the associated ring or annular surfaces 17, 18 of the valve plate 6. The ring portions 19 of the valve plate 6 which extends into the valleys of the undulated portion need not contact the metal flanks, rather can also only serve for the deflection and throttling of the flow. Whether, viewed in the direction of flow, initially the first or initially the last ring region with tangential line contact comes into play, is dependent upon the constructional details as well as upon the side effects which are desired to be obtained, such as particularly the reduction in noise.

Figure 3:
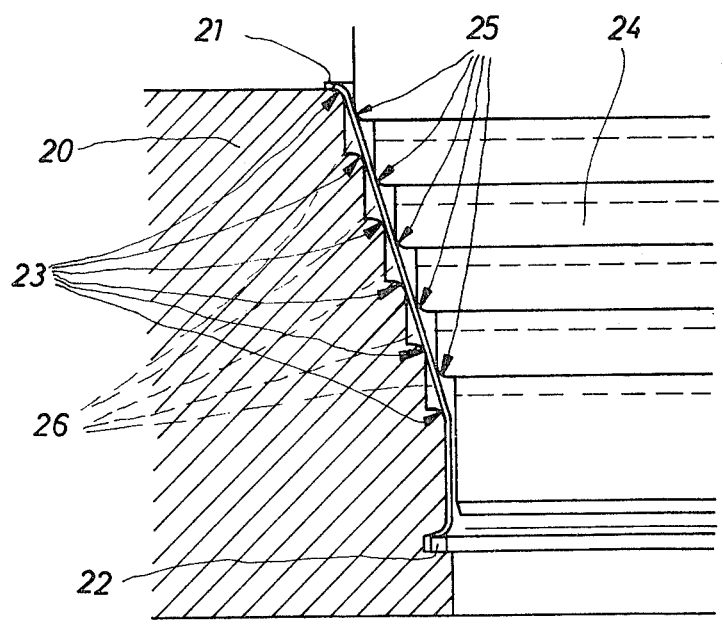
FIG. 3 illustrates a further modification of the invention.

With the constructional embodiment depicted in FIG. 3, a cone-shaped sheet metal or metallic member 21 is provided in a valve housing 20, this sheet metal member 21 here also is sealingly connected at its lower end by means of a press-in or contact ring 22 with the housing 20 and otherwise is only in contact at the inner surface with the housing through the agency of annular or ring edges 23 provided at uniform spacing from one another, and which form supports. After the assembly of the valve structure the sheet metal member extends conically between such ring edges 23. This deformable thin-wall body has operatively associated therewith a stepped cone 24 constituting a valve plate and forming the other sealing element, the stepped edges 25 of which are positioned at the regions or zones between the supporting ring edges 23 of the housing as soon as the valve plate 24 has almost reached the closed position. If this valve plate is urged against the housing 20 by means of a force which considerably exceeds the prescribed closing force, then, the conical sheet metal member 21 is plastically deformed between the ring edges 23 into ring-shaped depressions or recesses 26, as shown in phantom lines, and which deviates from the conical shape, and the valve plate moves further with the form or shape shown in phantom lines. Then during the subsequent closing operations with the prescribed closing force, there come to lie in such ring-shaped recesses or depressions the ring regions with line contact, so that at such locations the sheet metal member 21 with elastic compression, without having to overcome any play, bears at the stepped edges 25 of the valve plate 24 and brings about the sealing action.

With the exemplary embodiments depicted in FIGS. 1 to 3, the deformable sealing elements are fixedly connected in each case with the housing seat and the valve plate constitutes the other sealing element. Of course it is also possible to connect the deformable sealing element with the valve plate and to construct the housing as the other sealing element. This, however, is associated with the drawback that particular measures must be provided in order to sealingly, yet exchangeably, connect this element with the housing, which on the other hand can be realized more simply with the thin-wall body.

Figure 4:
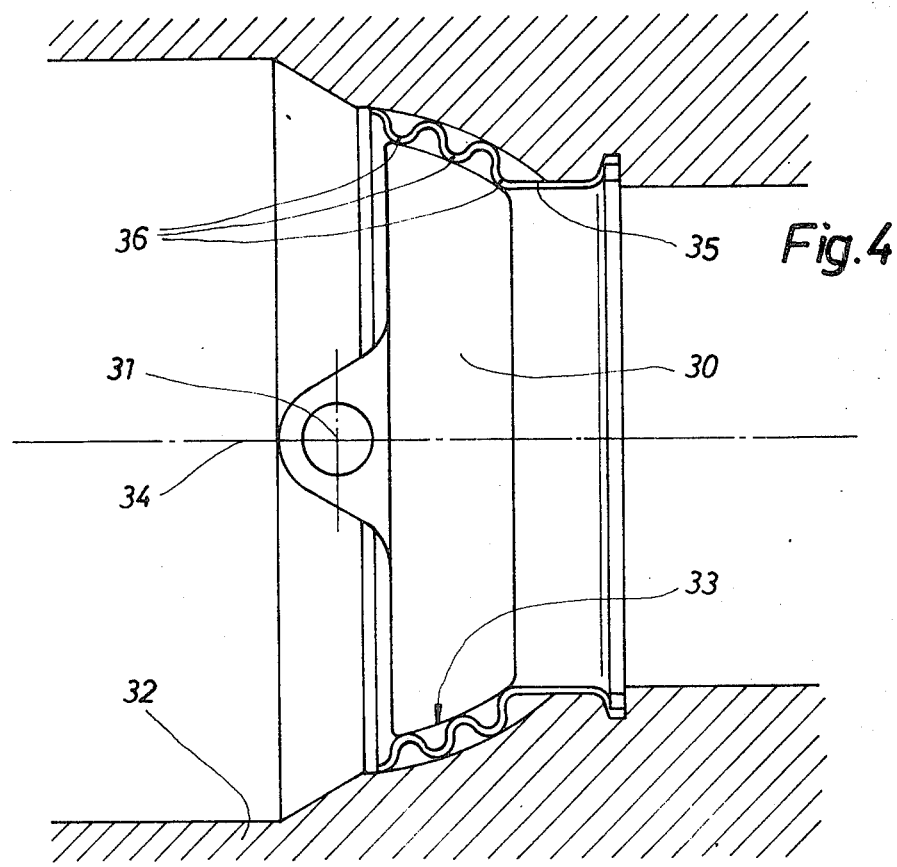
FIG. 4 illustrates a sealing system of the invention as used in a shutoff flap or throttle valve.
Figure 1:
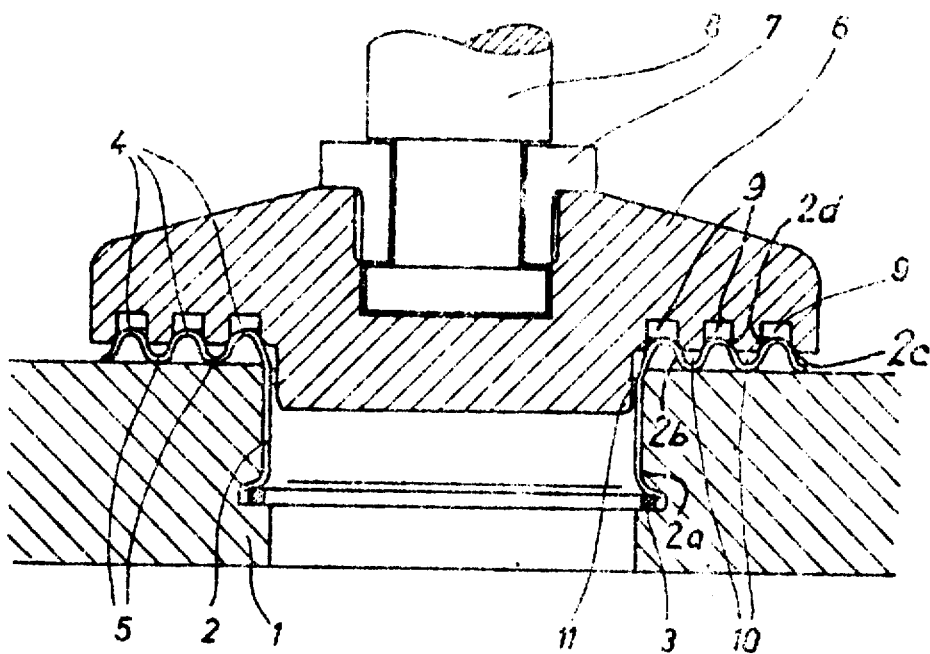
Figure 2:
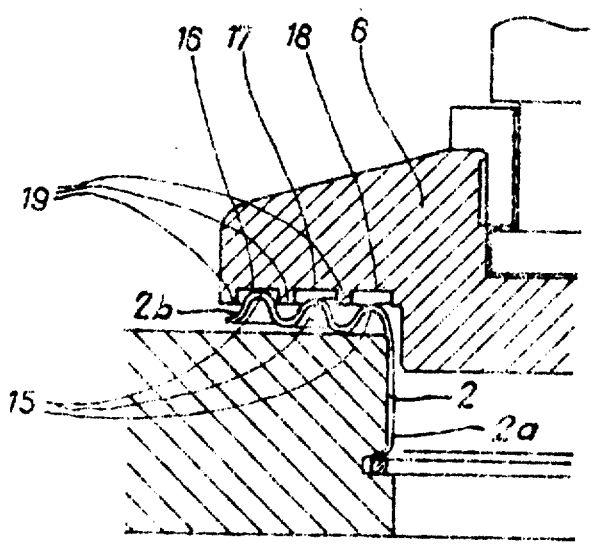

The flap or throttle valve member equipped with the sealing system as shown in FIG. 4, possesses an eccentrically mounted flap or throttle valve body 30, the shaft 31 of which does not extend through the sealing element provided or secured at the flap valve body 30 or housing 32. The flap valve body 30 possesses a spherical ring-surface 33 forming a sealing element, the center of the sphere being located at the point of the intersection of the axis of rotation of the flap valve body with the housing axis 34. In the housing 32 there is sealingly secured a sheet metal member or element 35 which constitutes the thin-wall body, this element 35 initially extending cylindrically and then conically at the region of the spherical ring-surface 33 of the flap valve body 30, as shown. At this region it possesses undulated peaks and valleys located concentric to the housing axis 34, the valleys being supported or bearing at the housing 32 and the crests or peaks in the closed condition of the valve structure being in sealing contact with the spherical ring surface 33 of the flap valve body 30, because in this position there occurs an elastic deformation of the thin-wall body 35, so that there are formed three ring regions possessing sealing contact 36. During opening of the valve arrangement by rotating the flap valve body, the ring regions are successively opened. In the event that the shaft 31 of the flap or throttle valve member does not intersect the housing axis 34, rather is skew or crosses such at a slight spacing, then during the opening movement there occurs a lifting of the spherical ring surface from the sheet metal element, so that there is dispensed with the need to relieve such element from a longer sliding movement under elastic deformation.

In the event that with the construction depicted in FIG. 4 the pressure impingement occurs from the left side, then with higher pressures there is also realized an accommodation of the sheet metal element at the flap valve body by means of the pressure of the medium which penetrates between the sheet metal element and the housing, wherein however the dimensioning of the thin-wall body formed by the sheet metal element must be carried out such that during opening there does not occur any plastic deformation of the body due to the action of the pressure of the medium.

While there is shown and described present preferred embodiments of the invention, it is to be distinctly understood that the invention is not limited thereto, but may be otherwise variously embodied and practiced within the scope of the following claims.

What is claimed is:

1. A sealing system for a shutoff element comprising
housing and blocking members of the shutoff element,
an annular metallic sealing element extending between said housing and blocking members and sealingly connected to one of said members,
said annular sealing element having a thin walled portion which is elastically deformable under a closing force between said housing and blocking members and extends through an annular width of said sealing element,
at least two annular supporting areas on each of said housing and blocking members which under the closing force make sealing linear contact with and deform said thin walled portion of said sealing element,
and free spaces for deformation of said thin walled portion therein, under the maximal closing force, on opposite sides of said thin walled portion from each of said annular supporting areas and enclosed by said thin walled portion and said other member than said member making the linear contact at the annular supporting area,
said annular supporting areas adjacent each of said free spaces for deformation, and said spaces on a member extending substantially parallel to said supporting areas on said same member.

2. The sealing system of claim 1, further characterized by
each of said housing and blocking members having at least two annular supporting areas of different diameters.

3. The sealing system of claim 1, further characterized by
a supporting area of one of said members located between said at least two annular supporting areas of the other of said members.

4. The sealing system of claim 1, further characterized by
said free spaces for deformation formed by annular indentations in at least one of said members.

5. The sealing system of claim 1, further characterized by
said free spaces for deformation formed by annular indentations in both of said members.

6. The sealing system of claim 1, further characterized by
said housing and blocking members of the shutoff element in a butterfly valve type element.

7. The sealing of claim 6, further characterized by
said thin walled portion having concentrically adjacent disposed undulated portions defining peaks and valleys forming said free spaces in annular form between the lines of linear contact of said thin walled portion and said housing and blocking members, said valley forming said supporting areas and said peaks forming said lines of linear contact.

8. The sealing system of claim 1, further characterized by
said free spaces being annular and possessing different volumes.

9. The sealing system of claim 1, further characterized by
at least said sealing element provided with a coating which improves at least one of the properties of sliding and sealing.

10. The sealing system of claim 1, further characterized by
said at least one of said members provided with a coating which improves at least one of the properties of sliding and sealing.

11. The sealing system of claim 1, further characterized by
the outer surface of said thin walled portion being inclined at an acute angle at the line of linear contact in the direction of the closing axis of said blocking member.

12. The sealing system of claim 1, further characterized by
said thin walled portion having undulated portions defining peaks and valleys.

13. The sealing system of claim 12, further characterized by
said thin walled portion linearly contacting said at least one of said housing and blocking members at the flanks of said undulated portions at an acute angle in the direction of the closing axis of said blocking member.

14. The sealing system of claim 1, further characterized by
said thin walled portion having the shape of a cone and made of sheet metal and located coaxial to the closing axis of said blocking member, said portion connected at one edge to one of said housing and blocking members.

15. The sealing system of claim 14, further characterized by
said thin walled portion supported by said supporting areas, said supporting areas forming annular edges at regular intervals on said at least one of said housing and blocking members.

16. A method of producing a shutoff in a sealing system comprising the steps of
moving a blocking member relative to a housing member along a closing axis,
pressing and deforming a deformable thin wall body sealingly between said blocking member and said housing member along at least two annular supporting areas on each of said housing and blocking members into free spaces on opposite sides of said thin wall body from said annular supporting areas with a force that substantially exceeds a prescribed closing force for the shutoff in the sealing system.

17. The sealing system of claim 16, further characterized by
said thin walled portion, under closing force, before fully closed position, contacting at least one of said members by linear contact with additional stepwise linear contacts with supporting areas resulting through gradual elastic deformation of said thin walled portion under continued closing force toward the fully closed position.

18. The method of claim 16, further characterized by exerting a force during the pressing step in a radial direction with sliding linear contacts between said thin wall body and at least one of said blocking and said housing members.

19. The method of claim 16, further characterized by establishing linear contacts between additional parts of said thin wall body in a concentric stepwise manner radially through gradual elastic deformation of said thin walled body under a continued closing force toward the fully closed position.

* * * * *

UNITED STATES PATENT OFFICE
CERTIFICATE OF CORRECTION

Patent No. 3,945,390     Dated March 23, 1976

Inventor(s) RICHARD HUBER

It is certified that error appears in the above-identified patent and that said Letters Patent are hereby corrected as shown below:

In the drawings of the above-identified application (now patent 3,945,390), please add the reference numerals 2, 2a, 2b, 2c, and 2d with lead lines to Figs. 1 and 2 as shown on the attached copy and indicated in red, which were inadvertently omitted from the formal drawings as filed.

Signed and Sealed this

First Day of March 1977

[SEAL]

Attest:

RUTH C. MASON
Attesting Officer

C. MARSHALL DANN
Commissioner of Patents and Trademarks